Sept. 9, 1958  M. B. RASMUSSON  2,850,990
CONFECTION MOLD FILLER
Filed July 19, 1956  3 Sheets-Sheet 1
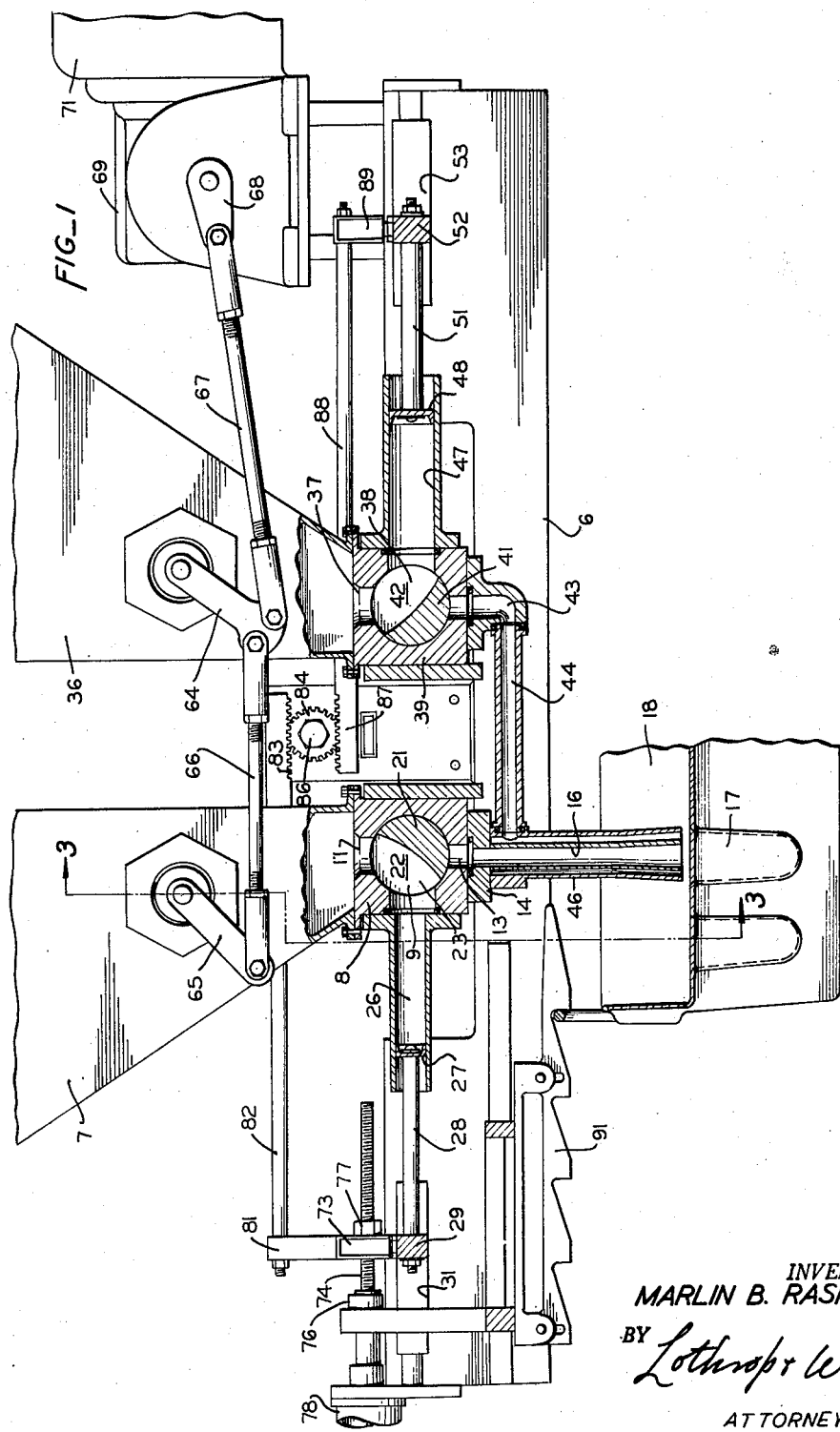
INVENTOR.
MARLIN B. RASMUSSON
BY Lothrop & West
ATTORNEYS

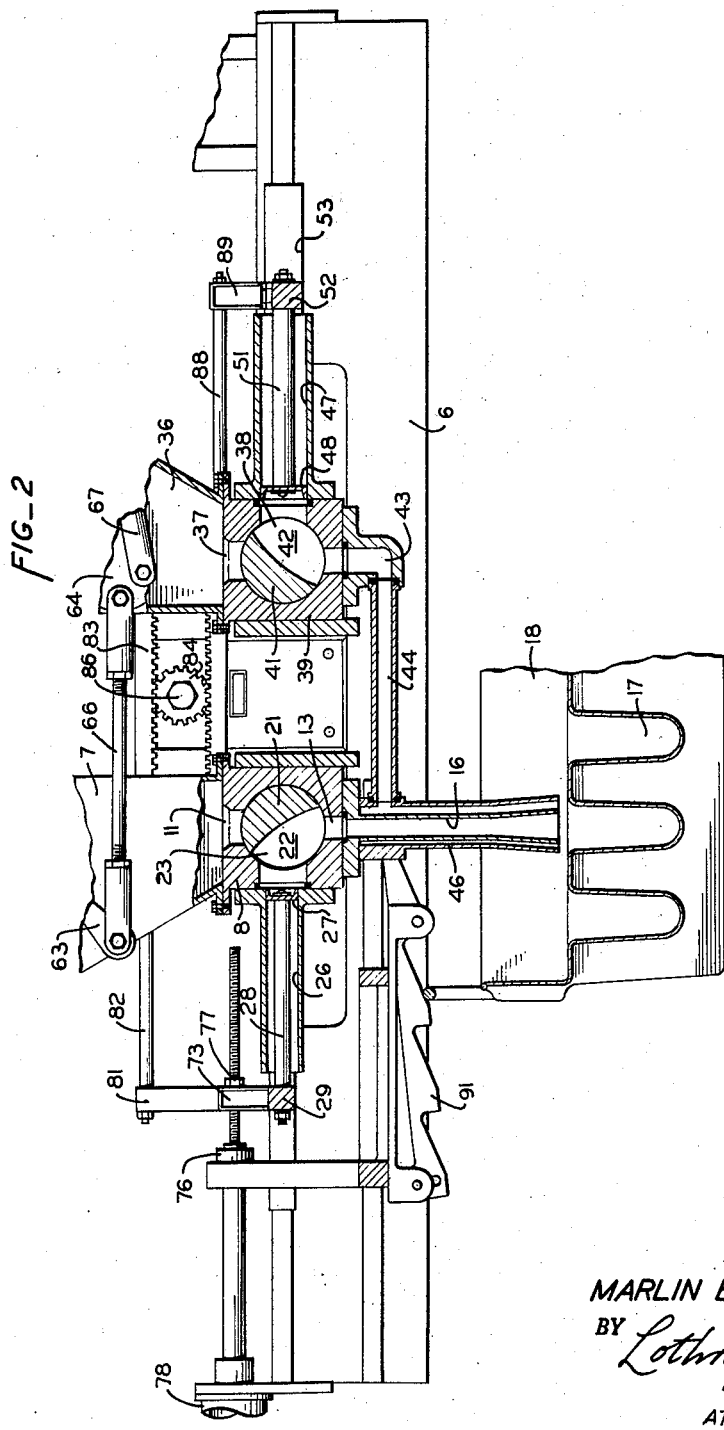

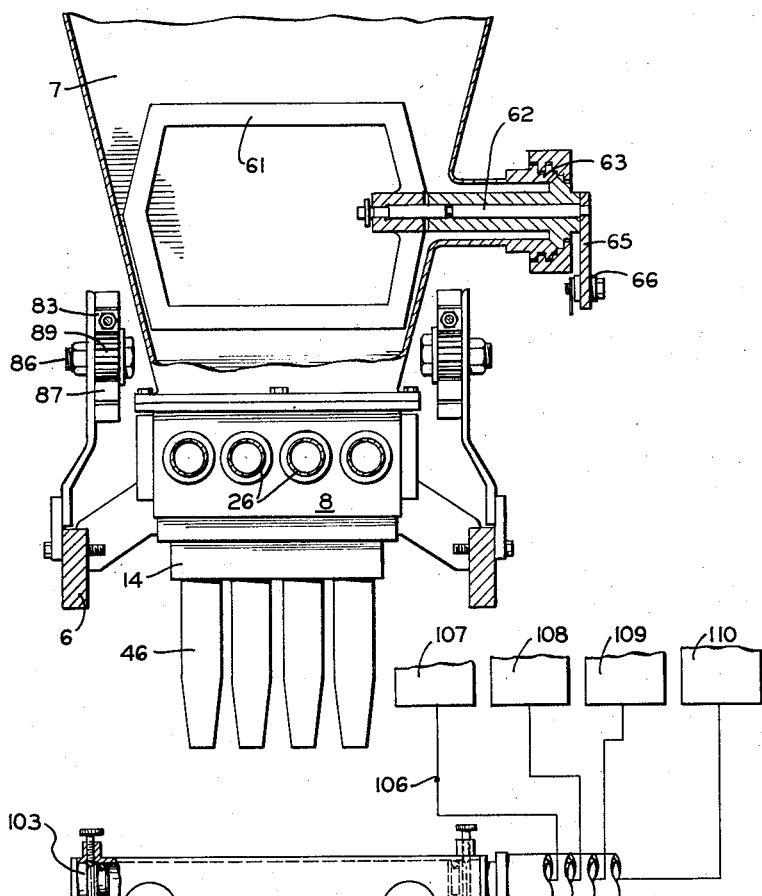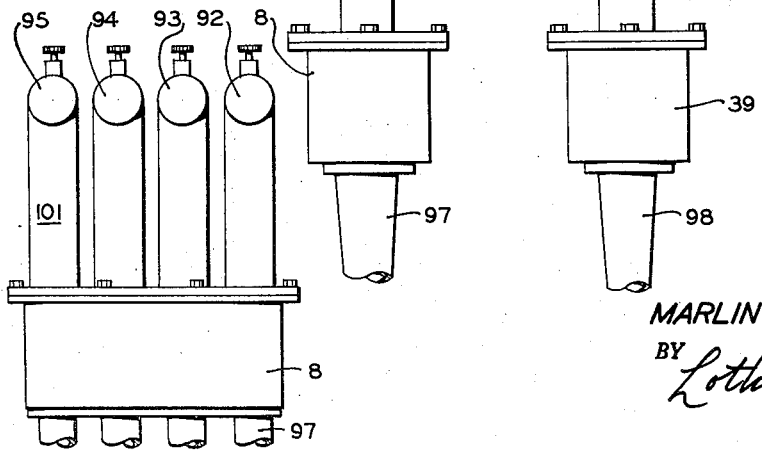

United States Patent Office 2,850,990
Patented Sept. 9, 1958

2,850,990

CONFECTION MOLD FILLER

Marlin B. Rasmusson, Sacramento, Calif.

Application July 19, 1956, Serial No. 598,926

4 Claims. (Cl. 107—1)

My invention relates to frozen confection machinery of the general sort shown in my co-pending application entitled "Automatic Filler for Confection Molds" filed October 17, 1955, with Serial Number 541,014. This application relates more particularly to a confection mold filler especially adapted for use in filling molds with multi-flavor ice cream or water ice confection.

In the supply of the frozen confection market it is not ordinarily sufficient to supply confections of one flavor only whether of ice cream or of water ice. There is a substantial demand for such confections when made up of two or more flavors or colors. While different colors usually accompany different flavors it is to be understood herein that reference to multi-flavors also includes reference to multi-colors whether or not the flavors are different and in general refers to the filling of frozen confection molds with different base materials for freezing.

It is an object of my invention to provide a confection mold filler effective in connection with automatic machinery for rapidly and accurately filling confection molds with a plurality of flavors.

Another object of the invention is to provide a confection mold filler readily adaptable for use in filling molds with a number of different flavors, two to four different flavors presently feasible Another object of the invention is to provide a confection mold filler arranged for trouble-free and protracted operation with adequate attention to sanitation.

Another object of the invention is to provide a confection mold filler usable with ice cream mix and with water ice mix with little difficulty in changeover.

A still further object of the invention is to provide a confection mold filler readily usable with automatic machines already in existence.

Another object of the invention is to provide a confection mold filler which is generally an improvement over those heretofore available.

Other objects together with the foregoing are attained in the embodiments of the invention described in the accompanying description and illustrated in the accompanying drawings in which:

Figure 1 is a side elevation of a confection mold filler in accordance with my invention, certain portions being shown in one extreme position in cross-section on a longitudinal vertical plane and with parts of the mechanism removed for clarity; the removed parts in general being the same as those disclosed in my above-identified application, and the set up being one normally utilized with ice cream mix of two flavors.

Figure 2 is a view comparable to Figure 1, certain parts being removed from the figure and showing the mechanism in an extreme position opposite that of Figure 1.

Figure 3 is a cross-section of the structure shown in Figure 1, the planes of the cross-section being indicated by the lines 3—3 of Figure 1.

Figure 4 is a side elevation comparable to Figure 1 and shows a modified version of my confection mold filler set up for use with multi-flavors of water ice, many parts of the structure being omitted for clarity and a part of the figure being diagrammatic and another part being in cross-section.

Figure 5 is an end elevation of some of the structure shown in Figure 4.

In the version of the structure shown in Figures 1 to 3 inclusive, there is provided mechanism generally similar to that in my above-mentioned application. In this arrangement there is provided a frame 6 on which is appropriately mounted a first hopper 7 for receiving a bulk amount of feed material usually ice cream mix of one color or one flavor. The first hopper 7 is removably mounted on a first valve body 8 and having a crossbore 9 therethrough supported on the frame 6. Opening into the crossbore 9 from the hopper 7 is one of a plurality of passages 11 arranged individually in a transverse row adjacent the bottom of the first hopper 7. In the present instance there are four separate passages 11 opening into the crossbore 9.

Somewhat similarly and in alignment with the various passages 11 there is another plurality of passages 13 in the first valve body 8 leading from the crossbore 9 into a nozzle fitting 14. In the present instance there are four spaced apart passages 13 in the valve body. The fitting 14 is detachably secured to the bottom of the valve body. Each passage 13 opens into a corresponding first nozzle 16 extending from the valve body into close proximity with and in registry with a mold cavity 17. This is one of a transverse row of four such cavities formed in a mold 18 disposed below the previously described nozzles. The four first nozzles 16 depending from the first valve body 8 are appropriately lined up with the four passages 13 and with the four mold cavities 17.

To control flow through the first valve body 8 there is disposed in the crossbore 9 a rotary valve 21. This is a generally circular cylindrical body having partitions 22 to define cavities 23 in the valve, there being four such cavities each corresponding to one of the passages 11. The valve is rotatable (by means not shown herein but fully disclosed in my mentioned application) between one extreme position illustrated in Figure 1 and an opposite extreme position illustrated in Figure 2 herein.

In the Figure 1 position the first hopper 7 is placed in communication through the various cavities 23 with individual cylinders 26. There is a group of first cylinders 26 four in number in the present instance. The cylinders 26 are removably attached to the first valve body 8 and each of them is provided with a first piston 27 at the end of a first piston rod 28 the group of first piston rods 28 being secured to a first crosshead 29. Guides 31 on the frame 6 serve to establish rectilinear movement of the first crosshead 29.

In the position of the parts shown in Figure 1, flow from the first hopper 7 is into the cylinders 26. As the parts move in the position shown in Figure 2, the material previously inducted into the first cylinders 26 is expelled through the differently positioned cavities 23 and is discharged through the group of first nozzles 16 into the mold cavities 17 to constitute a measured and timed deposit of the first mix.

The machine is substantially symmetrical, for the most part, about a central plane and includes a detachable second hopper 36 for ice cream mix; for example, of a second color or flavor. The second hopper 36 communicates through individual passages 37, four in number, with a crossbore 38 in a second valve body 39 mounted on the frame 6 and in all respects comparable to the first valve body 8. A rotary valve 41 in the second valve body 38 controls flow through individual chambers 42 therein between the passages 37 and a group of four passages 43 leading through connecting ducts 44 to a group of four second nozzles 46. The second nozzles 46 are preferably disposed around the first nozzles 16 and are concentric therewith.

The second valve body 39 is provided with a quadruple group of second cylinders 47 each of which is provided with its respective second piston 48. Each of the second pistons 48 is, in the present instance, considerably greater in diameter than the first pistons 27 so as to meter a larger volume of mix from the second hopper 36. A larger amount of the second mix is passed to each mold 17 since the second mix usually surrounds and encompasses the first mix. The second cylinders 47 and the first cylinders 26 and their respective pistons can all be made of the same size, if desired.

Each of the second pistons 48 is provided with its respective piston rod 51. All of the second piston rods 51 are connected to a second crosshead 52 suitably restrained in a guide 53 forming part of the frame 6. Upon reciprocation of the second crosshead 52, the various second pistons 48 are simultaneously reciprocated within the second cylinders 47. When the parts are in the position shown in Figure 1 the second pistons 47 induce flow of the second mix from the second hopper 36 into the second cylinders 47 and when the valve 38 has rotated into the position of Figure 2 and the parts move toward their Figure 2 positions the second pistons 48 discharge the second mix in timed measured amounts through the surrounding second nozzles 46 into the mold cavities 17.

To make sure that the relatively heavy ice cream mix is appropriately fluid throughout protracted operation and despite temperature changes which may occur, the first hopper 7 and the second hopper 36 are both provided with agitator paddles 61 mounted on shafts 62 extending through a suitable mounting 63 on the face of the hoppers. The agitator in the first hopper 7 is provided with an exterior arm 63 whereas the agitator in the second hopper 36 is provided with an arm 64. These arms are connected together by a tie rod 66 pivotally and adjustably secured thereto. The arm 64 is additionally connected by a pitman 67 adjustably and pivotally connected thereto to a crank 68 rotated by a reduction gear 69 driven by an electric motor 71 mounted on the frame 6.

Means are provided for operating the first pistons 27 and the second pistons 48 substantially in synchronism and at an appropriate time in connection with the operation of the valves 21 and 41, the valve operating mechanism being the same as that shown in my above identified application. For synchronously operating the various pistons, the first crosshead 29 is provided with a collar block 73 encompassing a threaded rod 74 and confined between a boss 76 and a jam nut 77 on the threaded rod. The rod itself is connected to a driving cylinder 78 preferably pneumatically operated in opposite directions and under control of the timing mechanism. The position of the jam nut 77 regulates the amount of lost motion and gives the block 73 a stroke which is shorter than the total stroke of the driving cylinder 78 by any adjusted or predetermined amount.

The motion of the collar block 73 is imparted to the first crosshead 29 because of the direct connection therebetween. This collar block motion is likewise imparted appropriately to the second crosshead 52. Upstanding from the block 73 is an extension 81 carrying a first rack rod 82. This rack rod at its inner end is provided with rack teeth 83 in mesh with one side of a reversing gear 84 on a shaft 86 carried by the frame 6. In mesh with the other side of the reversing gear 84 are rack teeth 87 formed at the inner end of a second rack rod 88 fixedly secured to a block 89 upstanding from and secured to the second crosshead 52.

In the operation of this mechanism, for each completed stroke of the driving cylinder 78 the first crosshead 29 is given an equivalent longitudinal oscillation minus the amount of lost motion on the rod 74. The first rack rod 82 through the reversing gear 84 gives an exactly comparable translation of the second rack rod 88 and a corresponding motion to the second pistons 48. Thus the first pistons and the second pistons are simultaneously actuated in directions opposite each other at appropriate times in the operation of the machine. The reversing gear 84 permits a relative approaching movement of the first pistons 27 and of the second pistons 48 at one time and a relative retracting movement of both sets of pistons at another time. Simultaneously induced into the first group of cylinders and the second group of cylinders are charges of the two flavored ice cream mixes from the two hoppers. This is followed by a simultaneous discharge of measured amounts of both mix flavors through the first nozzles 16 and the second nozzles 36 into the molds 17.

There is thus provided in each of the rows of cavities across the mold 18 an appropriate discharge of two flavors of material to be frozen. Appropriate mechanism 91 advances the mold 18 from time to time in synchronism with the operation of the pistons as clearly described in the above-identified application. With this structure therefore there is provided a mechanism for simultaneously discharging into a plurality of mold cavities two flavors of confection such as ice cream mix to be frozen. The various parts are all readily removed from the mechanism for cleaning and servicing and the operation is set up to repeat itself indefinitely after initial adjustment of the jam nut 77 and after initial selection of the right ratio of sizes for the first pistons and the second pistons.

In some instances it is desired to utilize much of this mechanism for the introduction of more than two flavors into the various mold cavities 17 and this is readily accomplished in connection with more fluid material such as water ice mix. This arrangement is as shown in Figures 4 and 5. While the first valve body 8 and the second valve body 39 are precisely as previously described and are positioned as before over the various mold cavities 17 and are otherwise unchanged, they are provided with different mechanisms to replace the first hopper 7, the second hopper 36 and the hopper agitating mechanism.

As is observable from Figure 1, the hoppers and agitators are readily removed from the valve bodies. To replace them there is provided a group of four manifolds 92, 93, 94 and 95. Also, the fitting 14, the concentric first nozzles 16 and second nozzles 46 are removed as well as the connecting tubes 44 and the fittings 43. These are replaced by a transverse row of four individual nozzles 97 on the first valve body 8 and a transverse row of four individual nozzles 98 on the second valve body 39 so that the row of nozzles 97 is disposed over a cross row of mold cavities 17 and the row of second nozzles 98 is disposed over a longitudinally spaced cross row of mold cavities 17.

The manifolds, such as 92, are all substantially identical and each of them is provided with an individual conduit 101 connecting it with the valve body 8 and also with an individual conduit 102 connecting it with the valve body 39. One end of the manifold 92 is provided with a removable plug 103 whereas the other end is connected by a removable attachment 104 to an individual hose 106 or comparable conduit leading to a reservoir 107. Additional reservoirs 108, 109 and 110 are provided for different flavors or colors and each is connected in a similar fashion by a separate hose to its respective one of the manifolds 93, 94 and 95.

In the operation of this structure one flavor of mix is discharged to a pair of longitudinally spaced mold cavities 17 at a time. Since there are four separate reservoirs, four separate flavors are simultaneously dispensed to each of the four cavities 17 across the mold 18. The four nozzles 97 are first positioned with respect to the mold so as to fill the first crosswise row of cavities in the mold whereas the four nozzles 98 are disposed simultaneously to fill the fourth crosswise row of cavities in the mold. Three steps of advancement of the mold fill all of the cavities. Certain cavities lengthwise of the mold are filled simultaneously with the same flavor although the different cavities across the mold are filled with different flavors providing different flavors are supplied by the various reservoirs. It will be readily observed that the structure of Figures 4 and 5 is readily substituted for the structure of Figures 1, 2 and 3 and that the first and second cylinder mechanism interconnected to the reversing gear 84 and the first and second valving arrangements as well as the single driving cylinder 78 are in both instances fully effective to afford a timed and metered discharge of the selected kinds of confection for mold filling.

What is claimed is:

1. A confection mold filler comprising a filling nozzle having an inner tube and a concentric outer tube, a first cylinder having an opening in one direction and disposed on an axis, means for connecting said first cylinder to said inner tube, a second cylinder having an opening in the other direction and disposed on said axis opposite said first cylinder, means for connecting said second cylinder to said outer tube, a first piston in said first cylinder, an opposed second piston in said second cylinder, a reversing gear, a first rack meshing with one side of said gear and connected through the opening in said first cylinder to said first piston, a second rack meshing with the other side of said gear and connected through the opening in said second cylinder to said second piston, and a driving mechanism connected to said first piston.

2. A confection mold filler comprising a frame, a first hopper on said frame, a first nozzle on said frame, a first valve body interconnecting said first hopper and said first nozzle, a first cylinder interconnected with said first valve body, a first piston in said first cylinder, a first crosshead slidable on said frame and connected to said first piston, a second hopper on said frame, a second nozzle on said frame and disposed concentrically with said first nozzle, a second valve body interconnecting said second hopper and said second nozzle, a second cylinder interconnected with said second valve body, a second piston in said second cylinder, a second crosshead slidable on said frame and connected to said second piston, a driving mechanism connected to said first crosshead, a reversing gear rotatable on said frame, a first rack meshing with one side of said gear and connected to said first crosshead, and a second rack meshing with the other side of said gear and connected to said second crosshead.

3. A confection mold filler comprising a frame, a first hopper on said frame, a first nozzle on said frame, a first valve body interconnecting said first hopper and said first nozzle, a first cylinder interconnected with said first valve body, a first piston in said first cylinder, a first crosshead slidable on said frame and connected to said first piston, a second hopper on said frame, a second nozzle on said frame disposed to discharge alongside said first nozzle, a second valve body interconnecting said second hopper and said second nozzle, a second cylinder opposing said first cylinder and interconnected with said second valve body, a second piston in said second cylinder, a second crosshead slidable on said frame and connected to said second piston, a reversing gear rotatable on said frame, a first rack meshing with one side of said gear and connected to said first crosshead, a second rack meshing with the other side of said gear and connected to said second crosshead, and a driving mechanism connected by a lost-motion connection to said first crosshead.

4. A confection mold filler comprising a frame, a first valve body on said frame, said first valve body having a first crossbore open to top, bottom, and side passages therein, a first hopper open to said top passages, first nozzles open to said bottom passages, first cylinders open to said side passages, a first valve in said first crossbore for controlling flow within said first valve body, a first crosshead reciprocable on said frame, first pistons in said first cylinders and connected to said first crosshead, a second valve body on said frame, said second valve body having a second crossbore therein parallel to said first crossbore and open to upper, lower, and lateral passages in said second valve body, a second hopper open to said upper passages, second nozzles open to said lower passages and disposed adjacent said first nozzles, second cylinders open to said lateral passages and extending in a direction opposite to that of said first cylinders, a second valve in said second crossbore for controlling flow within said second valve body, a second crosshead reciprocable on said frame, second pistons in said second cylinders and connected to said second crosshead, a reversing gear on said frame between said crossheads, and means for connecting said crossheads to opposite sides of said reversing gear.

References Cited in the file of this patent

UNITED STATES PATENTS

| | | |
|---|---|---|
| 1,168,305 | Hood | Jan. 18, 1916 |
| 2,032,163 | Bagby | Feb. 25, 1936 |
| 2,099,252 | Bagby | Nov. 16, 1937 |
| 2,649,744 | Elwell | Aug. 25, 1953 |